United States Patent
Noda et al.

(10) Patent No.: US 10,357,765 B2
(45) Date of Patent: Jul. 23, 2019

(54) CARBON-CONTAINING METAL CATALYST PARTICLES FOR CARBON NANOTUBE SYNTHESIS AND METHOD OF PRODUCING THE SAME, CATALYST CARRIER SUPPORT, AND METHOD OF PRODUCING CARBON NANOTUBES

(71) Applicants: The University of Tokyo, Bunkyo-ku, Tokyo (JP); HITACHI CHEMICAL COMPANY, LTD., Chiyoda-ku, Tokyo (JP)

(72) Inventors: Suguru Noda, Tokyo (JP); Zhongming Chen, Tokyo (JP); Dong Young Kim, Tokyo (JP); Shunsuke Ueda, Tsukuba (JP); Eisuke Haba, Tsukuba (JP)

(73) Assignees: THE UNIVERSITY OF TOKYO, Tokyo (JP); HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/409,499

(22) PCT Filed: Jun. 20, 2013

(86) PCT No.: PCT/JP2013/066953
§ 371 (c)(1),
(2) Date: Dec. 19, 2014

(87) PCT Pub. No.: WO2013/191247
PCT Pub. Date: Dec. 27, 2013

(65) Prior Publication Data
US 2015/0147262 A1    May 28, 2015

(30) Foreign Application Priority Data
Jun. 22, 2012 (JP) ................. 2012-141427

(51) Int. Cl.
*B01J 37/02* (2006.01)
*B01J 35/02* (2006.01)
(Continued)

(52) U.S. Cl.
CPC .......... *B01J 37/0238* (2013.01); *B01J 21/18* (2013.01); *B01J 21/185* (2013.01); *B01J 23/74* (2013.01);
(Continued)

(58) Field of Classification Search
CPC . B01J 23/745; B01J 37/02; B01J 21/18; B01J 35/02; B01J 37/08; B82Y 30/00; B82Y 40/00; C01B 31/02
See application file for complete search history.

(56) References Cited

U.S. PATENT DOCUMENTS

2003/0211030 A1    11/2003  Olivier et al.
2005/0089467 A1*   4/2005  Grill .................. B82Y 10/00
                                                     423/447.3

(Continued)

FOREIGN PATENT DOCUMENTS

CN    101103150 A    1/2008
CN    101205060 A    6/2008
(Continued)

OTHER PUBLICATIONS

Emmenegger, et al., Synthesis of carbon nanotubes over Fe catalyst on aluminum and suggested growth mechanism, Carbon 2003; 41: 539-537.*

(Continued)

*Primary Examiner* — Daniel McCracken
(74) *Attorney, Agent, or Firm* — Fitch, Even, Tabin & Flannery LLP (57) ABSTRACT

The present invention relates to metal catalyst particles for carbon nanotube synthesis, comprising carbon-containing regions on their surfaces.

12 Claims, 9 Drawing Sheets

(51) Int. Cl.
C01B 31/02 (2006.01)
B01J 21/18 (2006.01)
B01J 23/745 (2006.01)
B82Y 30/00 (2011.01)
B01J 37/08 (2006.01)
B01J 23/74 (2006.01)
C01B 32/05 (2017.01)
C01B 32/162 (2017.01)
B82Y 40/00 (2011.01)
B01J 37/34 (2006.01)
B01J 35/00 (2006.01)
B01J 27/20 (2006.01)

(52) U.S. Cl.
CPC ........... *B01J 23/745* (2013.01); *B01J 35/026* (2013.01); *B01J 37/084* (2013.01); *B82Y 30/00* (2013.01); *C01B 32/05* (2017.08); *C01B 32/162* (2017.08); *B01J 27/20* (2013.01); *B01J 35/0006* (2013.01); *B01J 37/347* (2013.01); *B82Y 40/00* (2013.01)

(56) References Cited

U.S. PATENT DOCUMENTS

2007/0231486 A1* 10/2007 Noda ................ B82Y 10/00
427/249.6
2011/0297892 A1* 12/2011 Shah ................. B82Y 30/00
252/511

FOREIGN PATENT DOCUMENTS

| EP | 1787955 A1 | 5/2007 |
| EP | 2476648 A1 | 7/2012 |
| JP | 2007-091480 | 4/2007 |
| JP | 4621896 | 1/2011 |
| WO | 2007/035241 A2 | 3/2007 |
| WO | WO 2011/072071 A1 | 6/2011 |
| WO | WO 2012/057229 A1 | 5/2012 |

OTHER PUBLICATIONS

Schaper, et al., The role of iron carbide in multiwalled carbon nanotube growth, Journal of Catalysis 2004; 222: 250-254.*
Yoshida, et al., Atomic-Scale In-situ Observation of Carbon Nanotube Growth from Solid State Iron Carbide Nanoparticles, Nano Letters 2008; 8(7): 2082-2086.*
Deck, et al., Prediction of carbon nanotube growth success by the analysis of carbon-catalyst binary phase diagrams, Carbon 2006; 44: 267-275.*
Definition of particle, accessed online at: https://www.merriam-webster.com/dictionary/particles on May 13, 2017.*
Definition of discrete, accessed online at: https://www.merriam-webster.com/dictionary/discrete on May 14, 2017.*
Li, et al., Growth of Single-Walled Carbon Nanotubes from Discrete Catalytic Nanoparticles of Various Sizes, J. Phys. Chem. B 2001; 105: 11424-11431.*
Cheung, et al., Diameter-Controlled Synthesis of Carbon Nanotubes, J. Phys. Chem. B 2002; 106: 2429-2433.*
Futaba, et al., 84% Catalyst Activity of Water-Assisted Growth of Single Walled Carbon Nanotube Forest Characterization by a Statistical and Macroscopic Approach, J. Phys. Chem. B 2006; 110: 8035-8038.*
Yu, et al., High Density, Vertically-Aligned Carbon Nanotube Membranes, Nano Letters 2009; 9(1): 225-229, with Supporting Information.*
Kharlamova, Investigation of growth dynamics of carbon nanotubes, Beilstein J. Nanotechnol. 2017; 8: 826-856.*
Wang, et al., Improving the scanning speed of atomic force microscopy at the scanning range of several tens of micrometers, Ultramicroscopy 2013; 124: 102-107.*
Iijima et al., Helical Microtubules of Graphic Carbon, Letters to Nature, Nov. 7, 1991, vol. 354, pp. 56-58.
Saito et al., Introduction and Application of Carbon Nanotubes, Baifukan Co., Ltd. Mar. 31, 2004 with partial translation.
Dai et al., Single-Wall Nanotubes Produced by Metal-Catalyzed Disproportionation of Carbon Monoxide, Chemical Physics Letters, 260, Sep. 27, 1996, p. 471-475.
Noda et al., Millimeter-Thick Single-Walled Carbon Nanotube Forests: Hidden Role of Catalyst Support, Japanese Journal of Applied Physics, 2007, vol. 46, No. 17, pp. 399-401.
Hasegawa et al., Growth Window and Possible Mechanism of Millimeter-Thick Single-Walled Carbon Nanotubes Forests, Journal of Nanoscience and Nanotechnology, 2008, vol. 8, No. 17, pp. 1-6.
Hasegawa et al., Diameter Increase in Millimeter-Tall Vertically Aligned Single-Walled Carbon Nanotubes During Growth, Applied Physics Express 3, 2010, p. 045103-1-045103-3.
Sugime et al., Millimeter-Tall Single-Walled Carbon Nanotube Forests Grown From Ethanol, Carbon 48, 2010, p. 2203-2211.
Hasegawa et al., Real-Time Monitoring of Millimeter-Tall Vertically Aligned Single-Walled Carbon Nanotube Growth on Combinatorial Catalyst Library, Japanese Journal of Applied Physics, 2010, p. 085104-1-085104-6.
Hasegawa et al., Moderating Carbon Supply and Suppressing Ostwald Ripening of Catalyst Particles to Produce 4.5-mm-tall Single-Walled Carbon Nanotube Forests, Carbon 49, 2011, 4497-4504.
International Search Report of Appln. No. PCT/JP2013/066953 dated Sep. 10, 2013 in English.
International Preliminary Report of Appln. No. PCT/JP2013/066953 dated Dec. 31, 2014 in Englilsh.
Kuttel et al., Field Emission From Diamond, Diamond-Like and Nanostructured Carbon Films, Carbon 37, 1999, pp. 745-752.
Search Report in counterpart application of Appln. No. 13807099.0 dated Jan. 21, 2016 in English.

* cited by examiner

CARBON-CONTAINING METAL CATALYST PARTICLES FOR CARBON NANOTUBE SYNTHESIS AND METHOD OF PRODUCING THE SAME, CATALYST CARRIER SUPPORT, AND METHOD OF PRODUCING CARBON NANOTUBES

TECHNICAL FIELD

The present invention relates to carbon-containing metal catalyst particles for carbon nanotube synthesis, a method of producing the same, a catalyst-carrying support, and a method of producing carbon nanotubes.

BACKGROUND ART

Carbon nanotubes are materials having cylindrical structures of rolled graphene sheets and having one-dimensional structures with significantly large aspect ratios (see Non Patent Literature 1). It is known that carbon nanotubes have excellent mechanical strength, flexibility, semiconductive or metallic conductivity, and high chemical stability. Methods of producing carbon nanotubes such as arc discharge, laser vaporization, and chemical vapor deposition (hereinafter referred to as CVD) have been reported. In particular, CVD is a synthesis method that has received attention as a synthetic method suitable for large-quantity synthesis, continuous synthesis, and high purification (see Non Patent Literature 2).

In particular, it is verified that single-walled carbon nanotubes (hereinafter referred to as "SWCNTs") exhibit metallic characteristics or semiconductive characteristics depending on the manner of winding and the diameter of the nanotube, and SWCNTs have been expected in applications to electrical and electronic elements and the like. SWCNTs have been synthesized mainly by a catalytic CVD method of growing nanotubes (for example, see Non Patent Literature 3). The catalytic CVD method uses metal nanoparticles as a catalyst. While a gaseous carbon source is being fed, the carbon source is pyrolyzed at a high temperature to grow nanotubes from the metal nanoparticles as the catalyst.

CITATION LIST

Non Patent Literature

Non Patent Literature 1: S. Iijima, Nature, 354, 56 (1991).
Non Patent Literature 2: "Kabon Nanochubo no Kiso to Ohyoh (Basics and Application of Carbon Nanotubes)" edited by Riichiro Saito and Hisanori Shinohara, BAIFU-KAN CO., LID., 2004.
Non Patent Literature 3: H. Dai, A. G Rinzler, P. Nikolaev, A. Thess, D. T. Colbert, and R. E. Smalley, Chem. Phys. Lett. 260, 471 (1996).

SUMMARY OF INVENTION

Technical Problem

Recently, mass production of multi-walled carbon nanotubes having diameters of about 10 to 20 nm has been developed, and several companies have plants having production per year of about 100 tons; now multi-walled carbon nanotubes have been commercially available at about 10000 yen/kg. In contrast, mass production of SWCNTs having excellent conductivity and flexibility has not been developed yet, and SWCNTs still have sold at about several ten thousand yen/g, which is several thousand times the price of the multi-walled carbon nanotubes.

To synthesize carbon nanotubes having small diameters, particularly SWCNTs, it is most important to form catalyst particles having diameters of several nanometers and hold the diameter during synthesis of carbon nanotubes. Unfortunately, in such catalyst particles having small diameters, much of chemically unstable surfaces thereof are exposed; for this reason, these catalyst particles become coarse to reduce the surface areas; or the catalyst particles readily react with oxygen or water to be oxidized, so that the diameters of the carbon nanotubes become larger or crystallinity reduces.

Then, an object of the present invention is to provide carbon-containing metal catalyst particles for carbon nanotube synthesis and a method of producing the same, a catalyst-carrying support, and a method of producing carbon nanotubes that can produce long carbon nanotubes having small diameters and high crystallinity.

Solution to Problem

The present invention provides carbon-containing metal catalyst particles for carbon nanotube synthesis having carbon-containing regions on their surfaces. The carbon-containing metal catalyst particles for carbon nanotube synthesis can grow long carbon nanotubes having small diameters and high crystallinity at high density.

The present inventors think the following reason that the effect of the present invention is attained. Usually, under a heating atmosphere, the number of catalyst particles reduces and their particle sizes increase due to high activity of the surfaces of the catalyst particles as time passes, synthesizing carbon nanotubes having larger diameters and shorter lengths. The catalyst particles having carbon-containing regions on their surfaces in the present invention have stabilized surfaces, suppressing a reduction in the number of particles and an increase in particle size. This can grow long carbon nanotubes having small diameters and high crystallinity. A reduction in the number of particles and an increase in particle size are suppressed as described above, so that carbon nanotubes can be produced at high density. The carbon-containing metal catalyst particles for carbon nanotube synthesis according to the present invention are suitable for production of SWCNT.

It is preferable that the carbon-containing metal catalyst particles for carbon nanotube synthesis according to the present invention contain at least one metal selected from the group consisting of Fe, Co, and Ni. Among these, it is particularly preferable that Fe be contained. These metals have a large amount of carbon solid solution, which readily forms carbon-containing regions on the surfaces of particles.

It is preferable that the carbon-containing metal catalyst particles for carbon nanotube synthesis according to the present invention be obtained by flowing a carbon-containing compound gas without an unsaturated bond onto a heated raw material substance to form carbon-containing regions on the surfaces of the raw material substance. Such a procedure can well form catalyst particles having carbon-containing regions on their surfaces because carbon in the carbon-containing compound gas without an unsaturated bond is dissolved on the surfaces of the catalyst particles to be formed.

It is preferable that the "carbon-containing compound gas without an unsaturated bond" be a saturated hydrocarbon gas and the saturated hydrocarbon gas be methane.

The present invention provides a catalyst-carrying support comprising a support and the carbon-containing metal catalyst particles for carbon nanotube synthesis carried on the support. These can produce carbon nanotubes at high density. It is preferable that the density of the carbon-containing metal catalyst particles for carbon nanotube synthesis on the support be one or more particles/100 nm$^2$.

Moreover, the present invention provides a method of producing the carbon-containing metal catalyst particles for carbon nanotube synthesis, comprising a carbon-containing region forming step of flowing a carbon-containing compound gas without an unsaturated bond onto a heated raw material substance to form carbon-containing regions on the surfaces of the raw material substance.

It is preferable that the "carbon-containing compound gas without an unsaturated bond" be a saturated hydrocarbon gas and the saturated hydrocarbon gas be methane.

Moreover, the present invention provides a method of producing carbon nanotubes, comprising a carbon nanotube synthesizing step of flowing a raw material gas onto the heated carbon-containing metal catalyst particles for carbon nanotube synthesis to synthesize carbon nanotubes. Furthermore, the present invention provides a method of producing carbon nanotubes, comprising a carbon nanotube synthesizing step of flowing a raw material gas onto the heated catalyst-carrying support to synthesize carbon nanotubes. These production methods can produce long carbon nanotubes having small diameters and high crystallinity.

Advantageous Effects of Invention

The present invention can provide carbon-containing metal catalyst particles for carbon nanotube synthesis and a method of producing the same, a catalyst-carrying support, a method of producing carbon nanotubes that can produce long carbon nanotubes having small diameters and high crystallinity.

BRIEF DESCRIPTION OF DRAWINGS

FIG. 1(a) illustrates a case where the support is a particle, and FIG. 1(b) illustrates a case where the support is a fixed substrate.

DESCRIPTION OF EMBODIMENTS

Suitable embodiments according to the present invention will now be described in detail with reference to the drawings.

The carbon-containing metal catalyst particles for carbon nanotube synthesis according to the present embodiment (hereinafter also simply referred to as "carbon-containing metal catalyst particles") have carbon-containing regions on their surfaces. The method of producing carbon nanotubes according to the present embodiment comprises a step of flowing a raw material gas onto the heated carbon-containing metal catalyst particles for carbon nanotube synthesis. More specifically, the method of producing carbon nanotubes according to the present embodiment comprises a catalyst particle forming step and a carbon nanotube synthesizing step. The carbon-containing metal catalyst particles for carbon nanotube synthesis according to the present embodiment can be produced by performing a carbon-containing region forming step in at least one of the catalyst particle forming step and the carbon nanotube synthesizing step. These will now be described.

[Catalyst Particle Forming Step]

In the catalyst particle forming step, catalyst particles needed for synthesis of carbon nanotubes are formed. The catalyst particles are formed by heating and reducing a catalyst raw material such as a metal film or a metal oxide film formed on a support with a reducing gas such as hydrogen. At this time, an inert gas such as argon and nitrogen is used as a carrier gas.

It is preferable that a metal forming the catalyst particles be a metal typically used in synthesis of carbon nanotubes, and contain one or more elements selected from V, Cr, Mn, Fe, Co, Ni, Cu, Zn, Mo, W, and Au. Among these, Fe, Co, and Ni having a large amount of carbon solid solution are particularly preferable.

The support carrying the catalyst particles varies according to the method of synthesizing carbon nanotubes, and may be in a form of a particle or in a form of a plate. It is preferable that the material for the support contain one or more elements selected from the group consisting of Si, Al, Mg, Zr, Ti, O, N, C, Mo, Ta, and W. Specific examples of the material include oxides such as $SiO_2$, $Al_2O_3$, and MgO; nitrides such as $SiN_4$ and AlN; and carbides such as SiC. Particularly, a composite oxide of $Al_2O_3$—$SiO_2$ is preferable.

The support may include a carrier layer for carrying catalyst particles, and the catalyst particles may be carried on the carrier layer. The same material as that for the support can be used as the material for the carrier layer. The support may have a function as a carrier layer, and in this case, the carrier layer is not necessarily carried.

Figure 1:
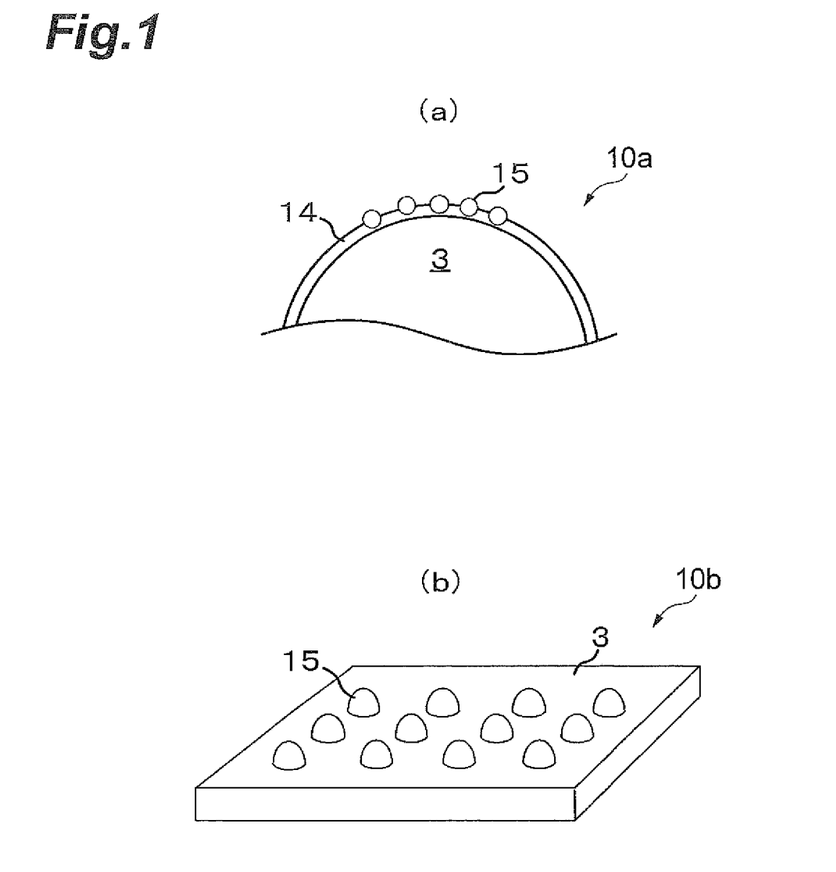
FIG. 1 is a schematic view illustrating an outline of a catalyst-carrying support.

Through the catalyst particle forming step, catalyst-carrying supports 10a and 10b carrying catalyst particles on supports are obtained, respectively. As illustrated in FIG. 1(a), when a support 3 is in a form of a particle, the catalyst-carrying substrate 10a is formed to have a carrier layer 14 formed on the support 3 and spherical or semi-spherical catalyst particles 15 formed on the carrier layer 14. As illustrated in FIG. 1(b), when the support 3 is in a form of a plate, the catalyst-carrying substrate 10b is formed to have spherical catalyst particles 15 embedded in the support 3.

For the method of adhering the catalyst raw material and the raw material for the carrier layer onto the support, a support may be immersed in a dissolution solution of these raw materials, or the dissolution solution of these raw materials may be applied onto a support, and be dried. Physical deposition, sputtering, CVD, and the like may be used.

It is preferable that the average particle size of the catalyst particles be 3 nm or less from the viewpoint of a reduction in the diameters of carbon nanotubes to be synthesized. It is preferable that in the catalyst-carrying supports 10a and 10b, the density of the catalyst particle be one or more particles/100 nm². Catalyst particles having a smaller particle size and a higher density can grow carbon nanotubes having smaller diameters at a higher density. Examples of the method of measuring the average particle size of catalyst particles include a method used in Examples described later.

It is preferable that the reducing temperature be 400 to 1000° C. It is more preferable that the reducing temperature be 400 to 900° C. from the viewpoint of suppression of catalyst poisoning such as coking. When a carbon-containing compound gas without an unsaturated bond described later is flowed at the same time, it is still more preferable that the reducing temperature be 500 to 900° C. to well dissolve carbon in the carbon-containing compound gas without an unsaturated bond on the surfaces of the catalyst particles.

[Carbon Nanotube Synthesizing Step]

The catalyst particles formed in the catalyst particle forming step are heated, and a raw material gas is flowed onto the catalyst particles; thereby, carbon nanotubes can be synthesized.

Here, the "raw material gas" refers to a gas comprising a carbon source containing a carbon atom and a hydrogen atom and decomposed when heated, and is composed, for example, of a carbon source used in synthesis of carbon nanotubes and a carrier gas. Acetylene, ethylene, ethanol, and the like can be used as the carbon source in the raw material gas. Acetylene may be contained in the raw material gas, or may be generated in a reactor. It is preferable that the carrier gas contained in the raw material gas be an inert gas such as argon and nitrogen. Alternatively, hydrogen may be used as the carrier gas. The "carbon-containing compound gas without an unsaturated bond" described later is not included in the raw material gas.

In the carbon nanotube synthesizing step, the concentrations of the gases in the total amount of the gases to be fed into the reactor may be properly adjusted by a conventional method to be optimized. For example, when the gas as the carbon source in the raw material gas is acetylene, it is preferable that the concentration in the reactor be 0.01 to 20% by volume based on the total amount of gas to be fed into the reactor (including acetylene in the raw material gas and acetylene generated in the reactor by decomposition), and it is more preferable that the concentration be 0.1 to 5% by volume based on the total amount of gas to be fed into the reactor. When only acetylene in the raw material gas is used of acetylene in the raw material gas and acetylene generated in the reactor by decomposition or the like, it is preferable that the concentration be 0.01 to 15% by volume, and it is more preferable that the concentration be 0.1 to 2% by volume. The synthesized carbon nanotubes can be separated and recovered from the catalyst particles by the conventional method.

It is preferable that the reaction temperature be 400 to 1000° C. From the viewpoint of suppression of catalyst poisoning such as coking, it is more preferable that the reaction temperature be 400 to 900° C. When the carbon-containing compound gas without an unsaturated bond described later is flowed at the same time, it is still more preferable that the reaction temperature be 500 to 900° C. to well dissolve carbon in the carbon-containing compound gas without an unsaturated bond on the surfaces of the catalyst particles.

[Formation of Carbon-Containing Regions]

In the method of producing carbon nanotubes according to the present embodiment, the carbon-containing compound gas without an unsaturated bond is flowed onto the catalyst raw material and/or the catalyst particles in at least one of the catalyst particle forming step and the carbon nanotube synthesizing step (carbon-containing region forming step). Namely, the carbon-containing compound gas without an unsaturated bond may be flowed when the catalyst raw material such as a metal film or a metal oxide film formed on the support is heated and reduced, or the carbon-containing compound gas without an unsaturated bond may be flowed during synthesis of carbon nanotubes.

When the carbon-containing compound gas without an unsaturated bond is flowed onto the catalyst raw material and/or the catalyst particles (these are collectively referred to as a "raw material substance"), carbon in the carbon-containing compound gas without an unsaturated bond is dissolved on the surfaces of the catalyst particles to form carbon-containing metal catalyst particles having carbon-containing regions on their surfaces. The surfaces of the catalyst particles having carbon-containing regions on their surfaces are stabilized (protected), and a reduction in the number of particles and an increase in particle size are suppressed. Thereby, long carbon nanotubes having small diameters and high crystallinity can be grown. Because a reduction in the number of particles and an increase in particle size are suppressed as described above, carbon nanotubes can be produced at high density. The method of producing carbon nanotubes according to the present invention is suitable for production of SWCNTs.

In particular, when the raw material gas and the carbon-containing compound gas without an unsaturated bond are flowed on the catalyst particles at least in the carbon nanotube synthesizing step, an increase in the particle size of the catalyst particles is suppressed while carbon nanotubes are continuously growing, thereby suppressing an increase in the diameters of the growing carbon nanotubes. As a result, the carbon nanotubes to be synthesized have higher crystallinity. An increase in the size of the catalyst particle is suppressed more to increase the life of the catalyst, and longer carbon nanotubes can be synthesized.

It is preferable that the carbon-containing compound gas without an unsaturated bond be flowed in both of the catalyst particle forming step and the carbon nanotube synthesizing step. If the carbon-containing regions are preliminarily formed on the surfaces of the particles before synthesis of carbon nanotubes, the particle size of the particles can be reduced in advance. Even when the carbon-containing regions are formed on the surfaces of the catalyst particles before synthesis of carbon nanotubes, the stable state of the surfaces of the carbon-containing metal catalyst particles is not always kept until the synthesis of carbon nanotubes is completed; for this reason, the raw material gas and the carbon-containing compound gas without an unsaturated bond are also flowed onto the carbon-containing metal catalyst particles during the synthesis of carbon nanotube to suppress an increase in the particle size of the catalyst particles and an increase in the diameters of carbon nanotubes which are growing.

Through the specification, the "catalyst particles" refer to particles prepared by heating and reducing a catalyst raw material such as a metal film or a metal oxide film with a reducing gas such as hydrogen. Through the specification, the "carbon-containing metal catalyst particles" refer to particles prepared by heating and reducing a catalyst raw material such as a metal film or a metal oxide film with a reducing gas such as hydrogen and having carbon-containing regions on their surfaces. The "carbon-containing metal catalyst particles" refer to particle portions excluding portions of carbon nanotubes when the carbon nanotubes are synthesized on the surfaces of the particles. Namely, the carbon nanotubes are not considered as carbon forming the carbon-containing regions.

Through the specification, a metal as a catalyst raw material, a metal oxide generated by air oxidation of the metal, and the catalyst particles fed to the carbon nanotube synthesizing step without contacting the carbon-containing compound gas without an unsaturated bond (catalyst particles before the carbon-containing regions are formed on their surfaces) are collectively referred to as a "raw material substance" as described above. Namely, it can be said that the method of producing carbon nanotubes according to the present embodiment comprises flowing a carbon-containing compound gas without an unsaturated bond onto a heated raw material substance to form carbon-containing regions on the surfaces of a raw material substance.

Examples of the carbon-containing compound gas without an unsaturated bond include saturated hydrocarbons, alcohols, amines, and ethers; among these saturated hydrocarbons are preferable. It is preferable that the carbon-containing compound gas without an unsaturated bond have 2 or less carbon atoms, and it is particularly preferable that the carbon-containing compound gas without an unsaturated bond have one carbon atom. When the carbon-containing compound gas without an unsaturated bond is a saturated hydrocarbon, it is preferable that the saturated hydrocarbon be methane. Carbon nanotubes will not grow from the carbon-containing compound gas without an unsaturated bond (see FIGS. 9(a) to 9(f) described later). In contrast, if gases like unsaturated hydrocarbons, which are more unstable than saturated hydrocarbons and become stable when decomposed into carbon and a gas such as hydrogen, are used, carbon nanotubes start growing, not attaining the effect of protecting the surfaces of the particles with carbon.

Whether carbon-containing regions are formed on the surfaces of the particles can be checked by X-ray photoelectron spectroscopy (XPS). Through the specification, the term "having carbon-containing regions on their surfaces" indicates that the amount of carbon atoms after etching with Ar is 3 at % or more when the surfaces are observed by XPS. It is preferable that the value be 3 to 100 at %, and it is more preferable that the value be 5 to 50 at %.

In formation of carbon-containing regions on the surfaces, it is preferable that the concentration of the carbon-containing compound gas without an unsaturated bond be 0.1 to 50% by volume based on the total amount of gases to be fed into a reactor. When the reducing temperature and/or the reaction temperature is 900° C. or more in the catalyst particle forming step and/or the carbon nanotube synthesizing step, influences of catalyst poisoning such as coking readily occur; for this reason, from the viewpoint of suppression of these influences, it is more preferable that the concentration of the carbon-containing compound gas without an unsaturated bond be 0.1 to 20% by volume.

When the carbon-containing compound gas without an unsaturated bond is flowed on the catalyst raw material and/or particles in the catalyst particle forming step, the carbon in the carbon-containing compound gas without an unsaturated bond is dissolved on the surfaces of the particles to form the catalyst particles having carbon-containing regions on their surfaces (carbon-containing metal catalyst particles), as described above. In this case, a releasing step of releasing the catalyst particles from a heated state can be provided between the catalyst particle forming step and the carbon nanotube synthesizing step.

When the catalyst particles have the carbon-containing regions on their surfaces, the surfaces are stabilized, so that the particle size or the like is barely changed due to deactivation by oxidation caused by mixing of oxygen during the process and changes in temperature. Usually, when the surfaces of the catalyst particles are exposed and oxygen is mixed or the temperature changes after production of the catalyst, the catalyst readily deactivates. In contrast, in the case of the catalyst particles having the carbon-containing regions on their surfaces, for example, even if a catalyst production apparatus and a carbon nanotube synthesizing apparatus are separately provided, influences of mixing of oxygen accompanied by conveyance between these apparatuses and changes in temperature can be suppressed.

As a method of synthesizing long carbon nanotubes, addition of a catalyst activator such as water vapor during synthesis is known (for example, Japanese Patent No. 4621896). The method of producing carbon nanotubes according to the present embodiment can be applied to a system for adding water vapor.

[Reactor]

Figure 2:
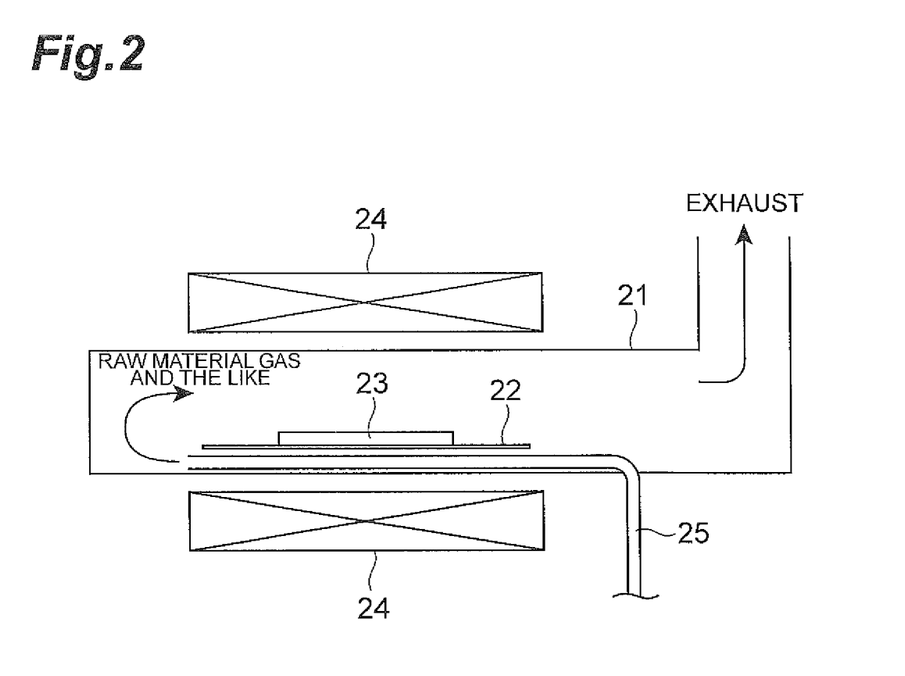
FIG. 2 is a schematic view illustrating a production apparatus when carbon nanotubes are produced by on-substrate thermal CVD.

The method of producing carbon nanotubes according to the present embodiment can be performed in on-substrate thermal CVD or in fluidized bed thermal CVD. The on-substrate thermal CVD includes hot-wall CVD to externally heat a reaction tube and cold-wall CVD to heat only a substrate while a reaction tube is kept at a low temperature, and any of these synthetic methods can be performed. FIG. 2 is a schematic view illustrating a production apparatus for producing carbon nanotubes by hot-wall CVD. A reactor 21 includes a cylinder horizontally disposed and having one closed end, and includes a raw material gas feeding tube 25 in communication between the outside of the container and the inside thereof. Heaters 24 are disposed around the reactor 21.

In the reactor 21, a support 23 having a catalyst raw material layered thereon is placed on a quartz board 22, and is disposed inside the reactor 21. In this state, the catalyst particle forming step is performed to form a catalyst-carrying support 10b from the support 23. The catalyst-carrying support 10b is heated, and a raw material gas containing acetylene is flowed onto the catalyst-carrying support 10b through the raw material gas feeding tube 25; then, carbon nanotubes can be synthesized on the catalyst-carrying support 10b. As the support carrying the catalyst, supports in plate forms as well as supports in powder forms, bead forms, honeycomb forms, porous forms, fiber forms, tube forms, wire forms, net forms, lattice forms, sponge forms, and layer forms can be used, for example.

Figure 3:
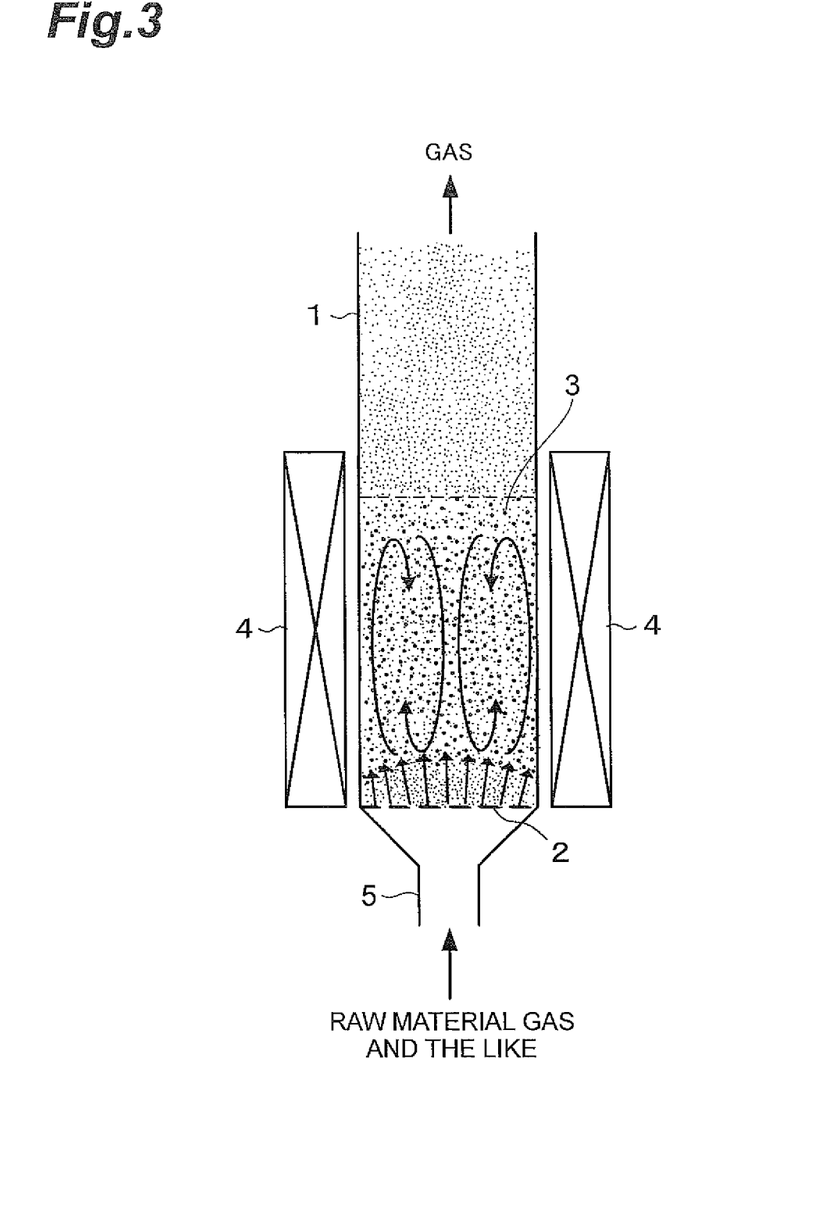
FIG. 3 is a schematic view illustrating a production apparatus when carbon nanotubes are produced by fluidized bed thermal CVD.

In contrast, FIG. 3 is a schematic view illustrating a production apparatus when carbon nanotubes are produced by fluidized bed thermal CVD. A reactor 1 vertically disposed includes a porous plate 2 disposed in a lower portion of the reactor 1; a raw material gas feeding tube 5 for feeding a gas such as a raw material gas is connected to a further lower portion of the reactor 1 than the porous plate 2. The reactor 1 is filled with a particulate support 3 on which a catalyst raw material is layered. Heaters 4 are provided so as to cover the outer periphery of the reactor 1. In this state, the catalyst particle forming step is performed to form a catalyst-carrying support 10a from the support 3. The catalyst-carrying support 10a is heated, and a raw material gas or the like is flowed onto the catalyst-carrying support 10a through the raw material gas feeding tube 5 and holes of the porous plate 2; then, carbon nanotubes can be synthesized on the particulate support 3.

[Carbon Nanotubes]

The carbon nanotubes obtained by the method of producing carbon nanotubes according to the present embodiment have small diameters and high crystallinity. Catalyst particles having small particle size can exist on the support at high density, so that long carbon nanotubes are obtained at high density.

The diameters of carbon nanotubes can be determined with a transmission electron microscope (TEM), for example. The lengths (growth amounts) of carbon nanotubes can be determined with a scanning electron microscope (SEM), for example. Although an ideal diameter and length of a carbon nanotube depend on applications of carbon nanotubes, the method of producing carbon nanotubes according to the present embodiment can produce relatively long carbon nanotubes having relatively small diameters.

The crystallinity of carbon nanotubes can be evaluated by Raman spectroscopy. In the measurement by Raman spectroscopy, a G band attributed to graphite structure is observed at or near 1590 $cm^{-1}$ and a D band attributed to crystal defects is observed at or near 1340 $cm^{-1}$. The carbon nanotubes having high crystallinity have low peaks in the D band and high peaks in the G band. Namely, crystallinity is higher as the value of the ratio of the intensity of G band to the intensity of the D band defined by the following Expression (1) (ratio G/D) is higher:

$$\text{ratio } G/D = (G-Bg)/(D-Bg) \quad \text{Expression (1)}$$

where "G" indicates a peak top value of the G band, "D" indicates a peak top value of the D band, and "Bg" indicates a background correction value which is an average of the values from 600 $cm^{-1}$ to 1000 $cm^{-1}$.

It is thought that in the carbon nanotube having a low ratio G/D, amorphous carbon and the like adhere to the surfaces thereof, and the proportion of non-linear and bent carbon nanotubes is high. Amorphous carbon adhering to the surfaces of the carbon nanotubes is likely to inhibit electric conductivity between the carbon nanotubes, and bent carbon nanotubes have reduced electric conductivity and mechanical strength. For this reason, to draw electrical properties and mechanical strength of the carbon nanotubes, it is preferable that the ratio G/D be 8 or more, and it is more preferable that the ratio G/D be 10 or more.

As above, suitable embodiments according to the present invention have been described, but the present invention will not be limited to these embodiments.

EXAMPLES

The present invention will be described more specifically by way of Examples and Comparative Examples. The present invention will not be limited to these examples below.

Example 1

(Formation of Catalyst-carrying Substrate)

For a support, a silicon substrate with a thermally-oxidized film was used. On the silicon substrate, metal aluminum film (thickness: 15 nm) as a carrier layer, and a metal iron film (thickness: 0.7 nm) as a catalyst raw material were sequentially formed by sputtering.

(Formation of Catalyst Particles)

Next, the substrate was placed inside the reactor illustrated in FIG. 2, and catalyst particles (and then carbon-containing metal catalyst particles) were formed. The total flow rate of a gas to be introduced was 500 sccm (standard cubic centimeter per minutes), and the gas included hydrogen (25.0% by volume) and methane (1.0% by volume) as component gases; and argon was used as an atmosphere gas. The inner temperature of the reactor was 800° C., and the reaction time was 5 minutes. Thus, a catalyst-carrying substrate was obtained. The value expressed with % by volume is based on the total amount of gases to be fed to the reactor.

(Synthesis of Carbon Nanotubes)

Next, acetylene (0.15% by volume) was additionally introduced without changing the total flow rate, and carbon nanotubes were synthesized. As other gases, hydrogen (25.0% by volume) and methane (1.0% by volume), and argon as an atmosphere gas were introduced. The inner temperature of the reactor was still 800° C. from formation of the catalyst particles, and the reaction time was 10 minutes.

(Evaluation of Amount of Growth of Carbon Nanotubes)

Figure 4:
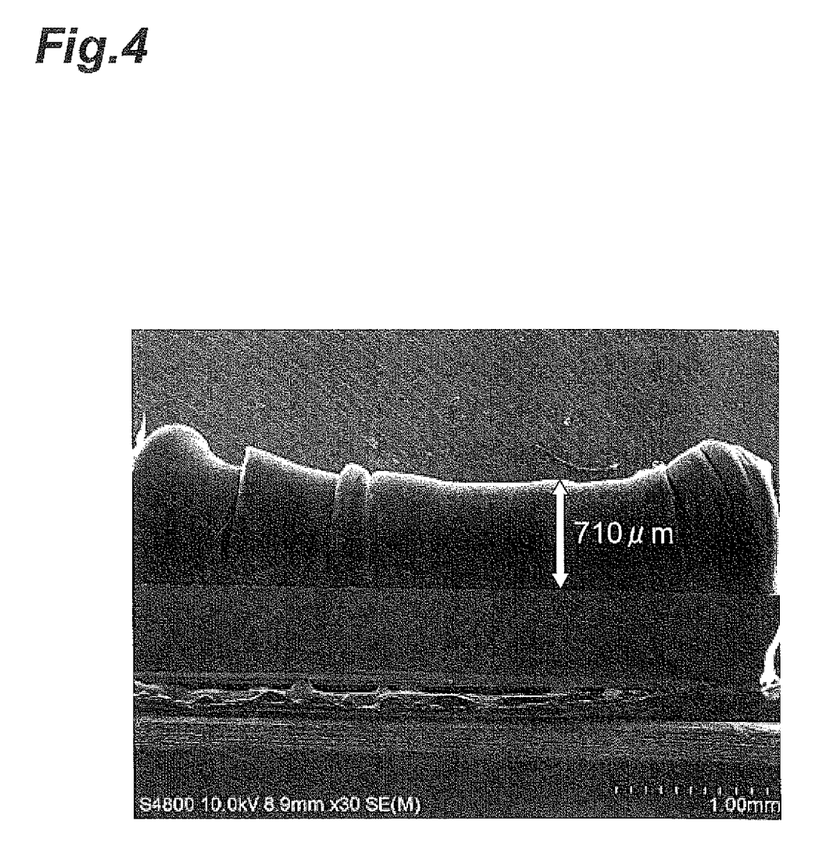
FIG. 4 shows an SEM image of a carbon nanotube produced in Example 1.

The produced carbon nanotubes were observed with a scanning electron microscope (SEM, available from Hitachi, Ltd.: S-4800), and the result is shown in FIG. 4. The carbon nanotubes grew 710 μm from the surface of the silicon substrate. The synthesized carbon nanotubes were observed with a transmission electron microscope (TEM, available from JEOL, Ltd.: 2000-EX) to measure the diameters of any 36 carbon nanotubes; the average diameter was 2.6 nm.

(Raman Measurement)

Figure 6:
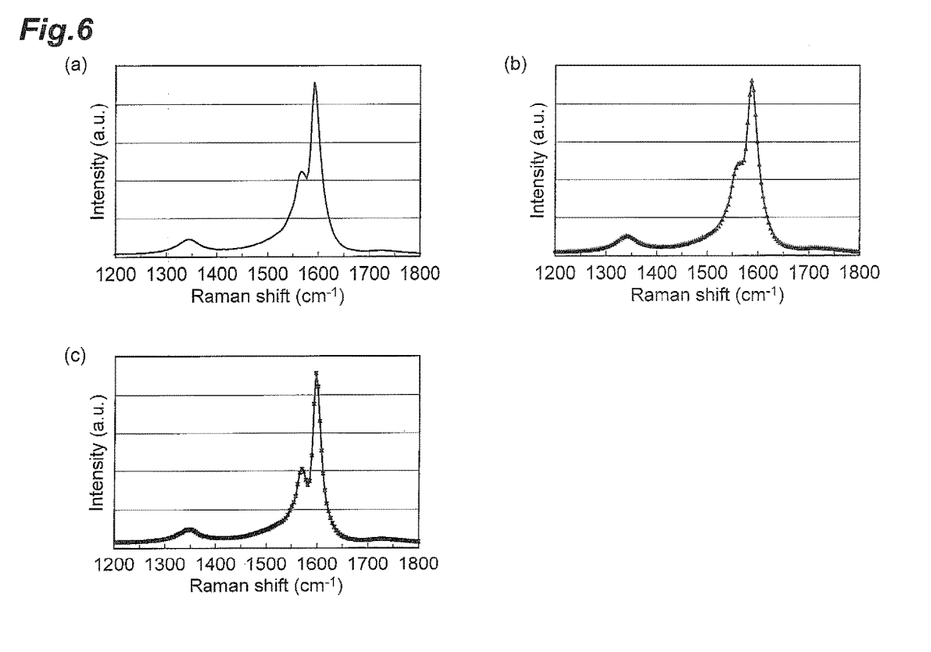
FIG. 6 shows Raman spectra of carbon nanotubes produced in Examples 1 to 3.

The crystallinity of the synthesized carbon nanotubes was evaluated with a Raman spectrometer (HORIBA Ltd.: HR-800) by Raman spectroscopy. The wavelength for measurement was 488 nm. As a result of the measurement, as shown in FIG. 6(a), a G band attributed to graphite structure was observed at or near 1590 $cm^{-1}$ and a D band attributed to crystal defects was observed at or near 1340 $cm^{-1}$. The ratio G/D indicating crystallinity was 11.1 from the ratio of the intensity of the G band to that of the D band, which indicated high crystallinity.

Example 2

Figure 5:
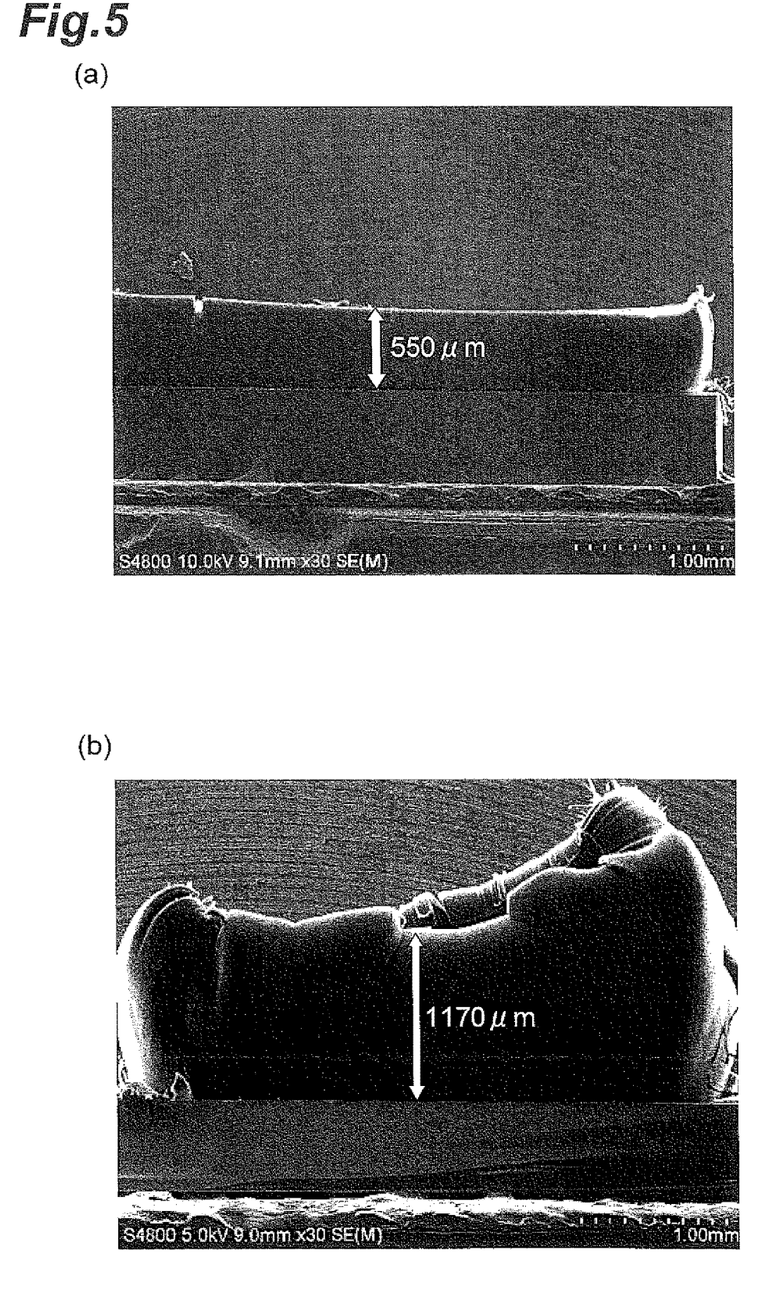
FIG. 5 shows SEM images of carbon nanotubes produced in Examples 2 and 3.

Carbon nanotubes were produced in the same manner as in Example 1 except that the amounts of hydrogen and methane to be fed were changed as in Table 1. The produced carbon nanotubes were observed in the same manner as in Example 1 with an SEM, and the result is shown in FIG. 5(a). The carbon nanotubes grew 550 μm from the surface of the silicon substrate. The measurement by Raman spectroscopy was performed in the same manner as in Example 1. As a result, the ratio G/D was 10.4; and the ratio G/D of 10 or more indicated high crystallinity although it was not as high as in Example 1 (FIG. 6(b)).

Example 3

Carbon nanotubes were produced in the same manner as in Example 1 except that water vapor was added to activate the catalyst as shown in Table 1. The produced carbon nanotubes were observed in the same manner as in Example 1 with an SEM, and the result is shown in FIG. 5(b). The carbon nanotubes grew 1170 μm from the surface of the silicon substrate. The measurement by Raman spectroscopy was performed in the same manner as in Example 1. As a result, the ratio G/D was 12.5, which indicated high crystallinity (FIG. 6(c)). This indicates that the effect of introducing methane is also effective in the system to which the catalyst activator is added.

Comparative Example 1

Figure 7:
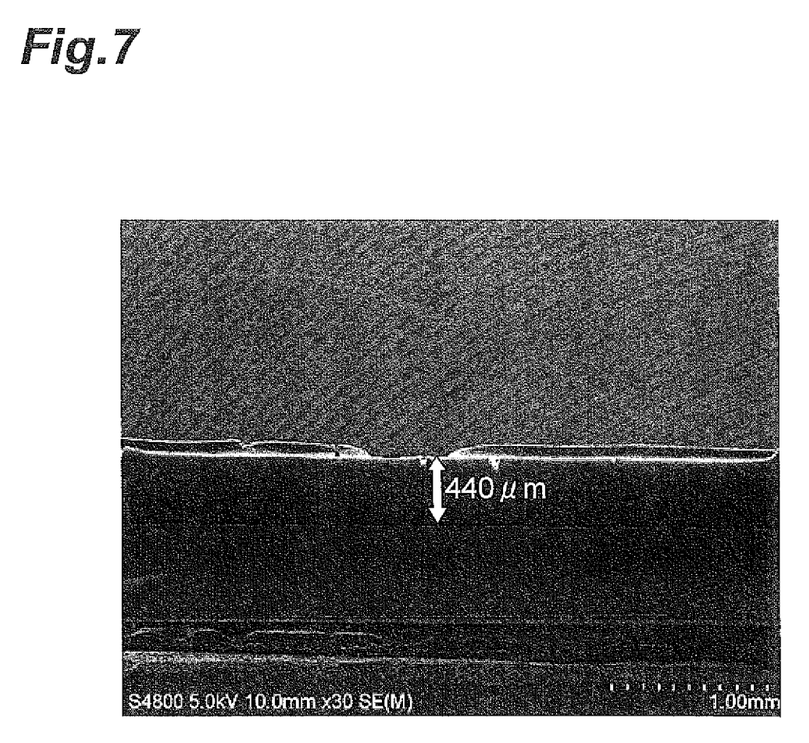
FIG. 7 shows an SEM image of a carbon nanotube produced in Comparative Example 1.
Figure 8:
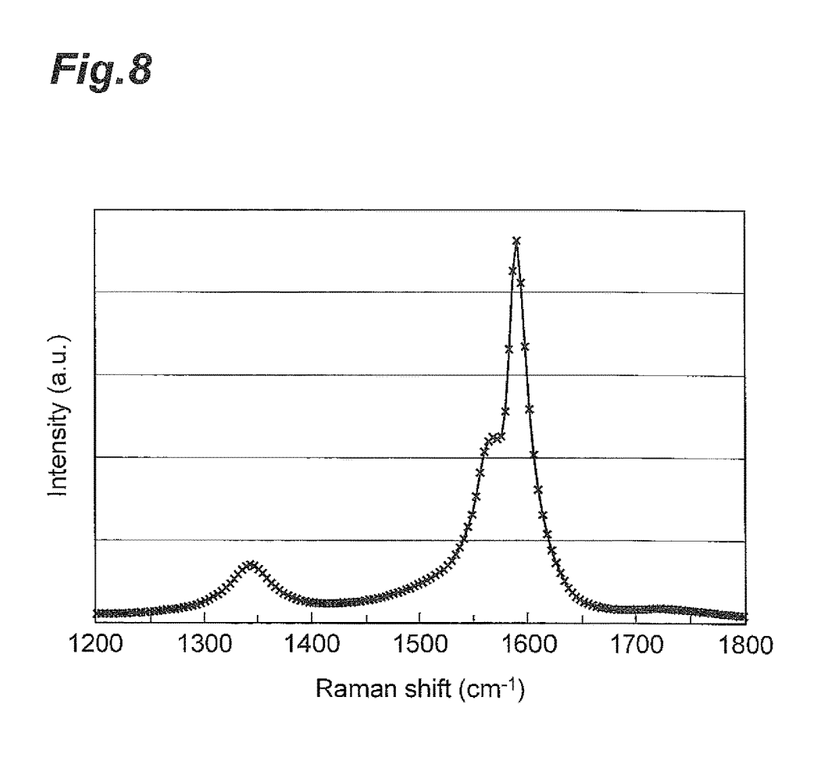
FIG. 8 shows a Raman spectrum of the carbon nanotube produced in Comparative Example 1.

Carbon nanotubes were produced in the same manner as in Example 1 except that the amounts of hydrogen and methane to be fed were changed as in Table 1. The produced carbon nanotubes were observed in the same manner as in Example 1 with an SEM, and the result is shown in FIG. 7. The carbon nanotubes grew 440 μm from the surface of the silicon substrate, and it turned out that the amount of growth of the carbon nanotubes was smaller than those in Examples 1 and 2. The diameters of any 33 carbon nanotubes were observed in the same manner as in Example 1 with a TEM, and measured an average of 3.4 nm. The measurement by Raman spectroscopy was performed in the same manner as in Example 1. As a result, the ratio G/D was 7.2, which indicated crystallinity inferior to those in Examples 1 and 2 (FIG. 8).

formed with an atomic force microscope (AFM; available from SHMADZU Corporation: SPM-9600) on the following measurement conditions: the scanning region was 200 nm×200 nm, the scanning rate was 1 Hz, and the number of pixels was 512×512.

Figure 9:
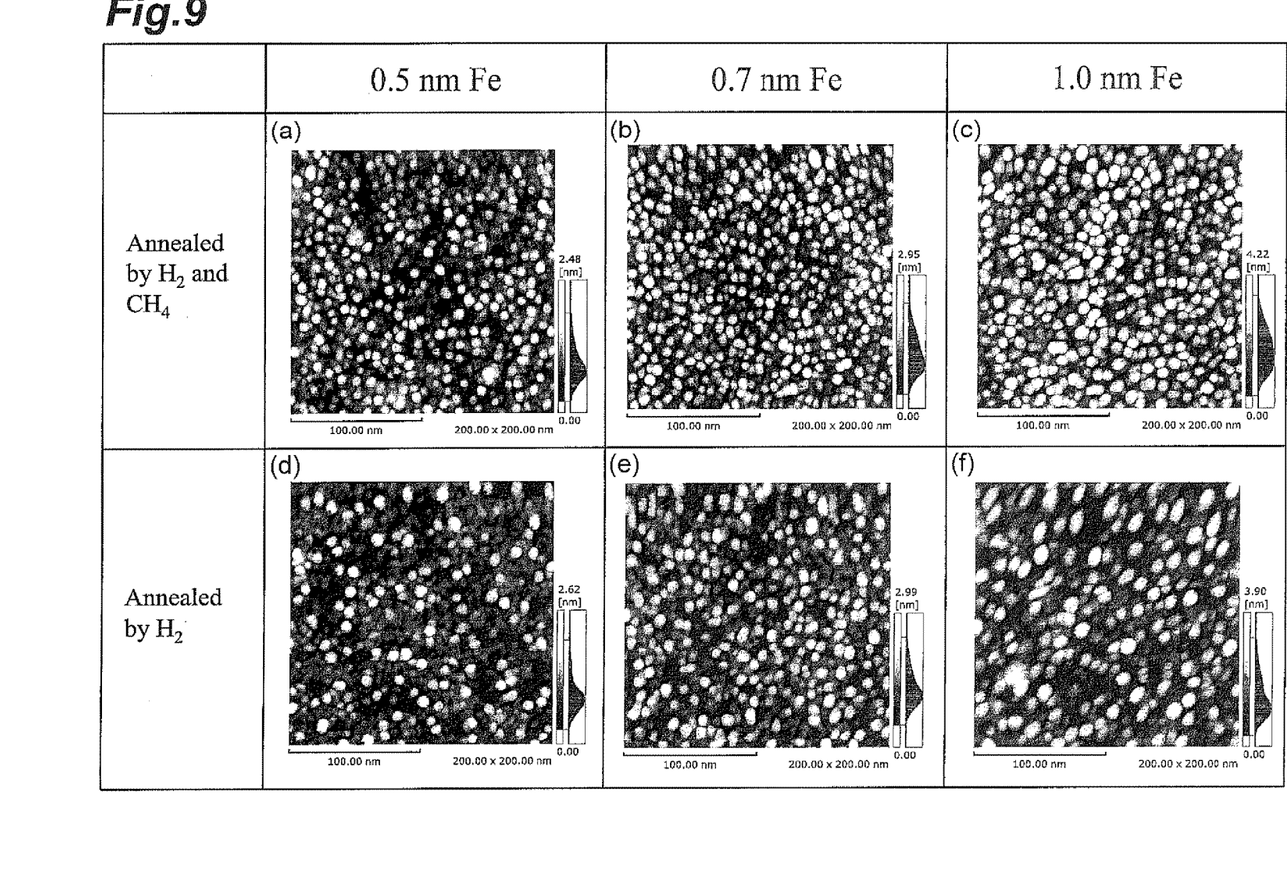
FIG. 9 shows AFM images of a variety of catalyst-carrying substrates containing catalyst-carrying substrates in Verification Examples 1 and 2.

The results when the catalyst-carrying substrate in Verification Example 1 was contained and methane was introduced in the catalyst particle forming step are shown in FIG. 9(a) to FIG. 9(c). The results when the catalyst-carrying substrate in Verification Example 2 was contained and methane was not introduced are shown in FIG. 9(d) to FIG. 9(f). In the drawings, white (bright) spots are catalyst particles; no fibrous substance was found on the surface of

TABLE 1

| | Catalyst particle forming step | | | Carbon nanotube synthesizing step | | | | Evaluation | | |
|---|---|---|---|---|---|---|---|---|---|---|
| | $H_2$ | Saturated hydrocarbon gas | $H_2O$ | $H_2$ | Saturated hydrocarbon gas | Carbon source gas in raw material gas | $H_2O$ | Length (μm) | RATIO G/D | Diameter (nm) |
| Example 1 | 25 vol % | $CH_4$ 1.0 vol % | 0 ppmV | 25 vol % | $CH_4$ 1.0 vol % | $C_2H_2$ 0.15 vol % | 0 ppmV | 710 | 11.1 | 2.6 |
| Example 2 | 25 vol % | $CH_4$ 1.0 vol % | 0 ppmV | 26 vol % | — | $C_2H_2$ 0.15 vol % | 0 ppmV | 550 | 10.4 | — |
| Example 3 | 25 vol % | $CH_4$ 1.0 vol % | 50 ppmV | 25 vol % | $CH_4$ 1.0 vol % | $C_2H_2$ 0.15 vol % | 50 ppmV | 1170 | 12.5 | — |
| Comparative Example 1 | 26 vol % | — | 0 ppmV | 26 vol % | — | $C_2H_2$ 0.15 vol % | 0 ppmV | 440 | 7.2 | 3.4 |

* "vol %" indicates % by volume based on the total amount of gases fed to the reactor. If the total is less than 100 vol %, the rest thereof constitutes argon.
* "ppmV" indicates a unit for expressing ppm as a volume concentration.

Verification Examples 1 and 2

The catalyst-carrying substrate obtained through the steps in Example 3 was used as a catalyst-carrying substrate in Verification Example 1. Formation of a film and catalyst particles was performed in the same manner as in Example 1 except that the amounts of hydrogen and methane to be fed were changed as shown in Table 2, and water vapor was added to activate the catalyst, and a catalyst-carrying substrate in Verification Example 2 was obtained.

TABLE 2

| | Catalyst particle forming step | | | Evaluation | |
|---|---|---|---|---|---|
| | $H_2$ | Hydrocarbon gas | $H_2O$ | Length (μm) | RATIO G/D |
| Verification Example1 | 25 vol % | $CH_4$ 1.0 vol % | 50 ppmV | Not grow | — |
| Verification Example2 | 26 vol % | — | 50 ppmV | Not grow | — |

*"vol %" indicates % by volume based on the total amount of gases fed to the reactor. If the total is less than 100 vol %, the rest thereof constitutes argon.
*"ppmV" indicates a unit for expressing ppm as a volume concentration.

(Observation of Catalyst Particles with AFM)

To observe the shapes of the catalyst particles immediately before the synthesis of carbon nanotubes, the surfaces of the catalyst-carrying substrates in Verification Example 1 and Verification Example 2 after the catalyst particle forming step were observed. To examine the tendency attributed to the difference in the thickness of the catalyst raw material, the substrates having thicknesses of metal iron of 0.7 nm (Verification Example 1 and Verification Example 2), 0.5 nm, and 1.0 nm (as values before and after 0.7 nm) were observed in the same manner. The observation was perthe substrate when methane was introduced, and it was found that carbon nanotubes did not grow.

The images were analyzed to evaluate the density of catalyst particles and the size of the catalyst particle (average value), and the results are shown in Table 3. The size of the catalyst particle was calculated from the density of catalyst particles and the amount of the film formed by sputtering, assuming that the shape of the catalyst was semi-spherical. It turned out that when methane was introduced, the size of the catalyst particle was smaller and the density of catalyst particles was higher than those when methane was not introduced. Namely, the density of catalyst particles is one or more particles in a region of 10 nm×10 nm when methane is introduced while the density of catalyst particles is one or less particle in a region of 10 nm×10 nm when methane is not introduced (low density). Consequently, it turned out that introduction of methane suppresses an increase in the size of the catalyst particles.

TABLE 3

| | | Thickness of iron formed into a film | | |
|---|---|---|---|---|
| | | 0.5 nm | 0.7 nm | 1.0 nm |
| Verification Example1 | Density of carbon-containing metal catalyst particles (particle/100 $nm^2$) | 1.42 | 1.30 | 1.48 |
| | Size of catalyst particle (nm) | 2.56 | 2.95 | 3.18 |
| Verification Example2 | Density of catalyst particle (particle/100 $nm^2$) | 0.85 | 0.90 | 0.87 |
| | Size of catalyst particle (nm) | 3.04 | 3.34 | 3.80 |

(Analysis of Surface State of Catalyst by XPS)

To evaluate the element composition on the surface of the substrate immediately before the synthesis of carbon nanotubes, the surfaces of the catalyst-carrying substrates in Verification Example 1 and Verification Example 2 were analyzed after the catalyst particle forming step. The analysis was performed with an X-ray photoelectron spectrometer (XPS; available form ULVAC-PHI, Inc.: PHI 5000 VersaProbeII). In the measurement, monochromatized AlKα-rays of 1486.6 keV were used, the is peak top of C for charge correction was 284.8 keV. The range in the measurement was Φ200 μm. The angle of detection was 45° from the surface of the sample. Impurities in the air adhere to the surface of the substrate; for this reason, the surface thereof was etched with Ar, and the element compositions detected before and after the etching were analyzed. The results of analysis were shown in Table 4. In the etching, a voltage of 1000 V was applied for 20 seconds, and the etching was performed such that the thickness of an $SiO_2$ film was about 1 nm. As a result, it was found that compared to the catalyst-carrying substrate in Verification Example 2 to which methane was not introduced, a large amount of C existed on the surface of the catalyst after the etching and the surface of the catalyst was covered with carbon in the catalyst-carrying substrate in Verification Example 1 to which methane was introduced.

TABLE 4

| Detected elements (at %) | | C | O | Fe | Al | Total (at %) |
|---|---|---|---|---|---|---|
| Verification Example1 | Before etching with Ar | 44.3 | 37 | 1.8 | 16.8 | 100 |
| | After etching with Ar | 29.3 | 44.3 | 3.7 | 22.7 | 100 |
| Verification Example2 | Before etching with Ar | 15.8 | 55.7 | 3.1 | 25.4 | 100 |
| | After etching with Ar | 2.6 | 62.8 | 4.7 | 29.9 | 100 |

INDUSTRIAL APPLICABILITY

The method of producing carbon nanotubes according to the present invention can mass-produce long carbon nanotubes having small diameters and high crystallinity and can reduce production cost significantly. Accordingly, it is noteworthy that the carbon nanotubes produced by the method according to the present invention are used in transparent electrodes, semiconductor thin films, materials for electrodes in lithium ion batteries, materials for electrodes in fuel cells, materials for electrodes in electric double-layer capacitors, filler materials for composite polymers, electron emission guns, field emission display, probes for microscopes, gas absorbing materials, and the like. In particular, it is noteworthy that the SWCNTs produced by the method according to the present invention are used in transparent electrodes, materials for electrodes in lithium ion batteries, materials for electrodes in electric double-layer capacitors, and the like.

REFERENCE SIGNS LIST 1, 21 . . . reactor, 2 . . . porous plate, 3, 23 . . . support, 4 . . . heater, 5, 25 . . . raw material gas feeding tube, 10a, 10b . . . catalyst-carrying support, 14 . . . carrier layer, 15 . . . catalyst particle, 22 . . . quartz board, 24 . . . heater.

The invention claimed is:

1. A catalyst-carrying support comprising a support and carbon-containing metal catalyst particles for carbon nanotube synthesis carried on the support,
   wherein the carbon-containing metal catalyst particles for carbon nanotube synthesis comprise carbon-containing regions on their surfaces, and
   wherein a density of the carbon-containing metal catalyst particles for carbon nanotube synthesis on the support is more than one particle/100 $nm^2$ under a measurement condition of being observed within a 200 nm ×200 nm scanning region on the support by an atomic force microscope.

2. The catalyst-carrying support according to claim 1, wherein the carbon-containing metal catalyst particles for carbon nanotube synthesis contain at least one metal selected from the group consisting of Fe, Co, and Ni.

3. The catalyst-carrying support according to claim 1, wherein the carbon-containing metal catalyst particles for carbon nanotube synthesis contain Fe.

4. The catalyst-carrying support according to claim 1, wherein the carbon-containing metal catalyst particles for carbon nanotube synthesis are obtained by flowing a carbon-containing compound gas without an unsaturated bond onto a heated raw material substance to form the carbon-containing regions on surfaces of the raw material substance.

5. The catalyst-carrying support according to claim 4, wherein the carbon-containing compound gas without an unsaturated bond is a saturated hydrocarbon gas.

6. The catalyst-carrying support according to claim 5, wherein the saturated hydrocarbon gas is methane.

7. A method of producing the catalyst-carrying support according to claim 1, comprising:
   a step of adhering a raw material substance to the support, and
   a carbon-containing region forming step of heating the raw material substance and flowing a carbon-containing compound gas without an unsaturated bond onto the heated raw material substance to form the carbon-containing regions on surfaces of the raw material substance.

8. The method of producing the catalyst-carrying support according to claim 7, wherein the carbon-containing compound gas without an unsaturated bond is a saturated hydrocarbon gas.

9. The method of producing the catalyst-carrying support according to claim 8, wherein the saturated hydrocarbon gas is methane.

10. A method of producing carbon nanotubes, comprising a carbon nanotube synthesizing step of flowing a raw material gas onto the heated catalyst-carrying support according to claim 1 to synthesize carbon nanotubes.

11. A method of producing carbon nanotubes, comprising:
   a carbon nanotube synthesizing step of flowing a raw material gas containing acetylene onto a heated catalyst-carrying support, wherein the catalyst-carrying support comprises a support and carbon-containing metal catalyst particles for carbon nanotube synthesis carried on the support, the carbon-containing metal catalyst particles for carbon nanotube synthesis comprise carbon-containing regions on their surfaces, and a density of the carbon-containing metal catalyst particles for carbon nanotube synthesis on the support is one or more particles/100 $nm^2$ under a measurement condition of being observed within a 200 nm×200 nm scanning region on the support by an atomic force microscope; and during the carbon nanotube synthesizing step, flowing methane onto the carbon-containing metal catalyst particles for carbon nanotube synthesis.

12. The method of producing carbon nanotubes according to claim 11, wherein the density of the carbon-containing metal catalyst particles for carbon nanotube synthesis on the support is more than one particle/100 nm$^2$.

* * * * *